May 1, 1951        E. L. SCHOLL        2,551,344
METHOD OF ELECTRODEPOSITING A METAL LAYER ON RUBBER
Original Filed Oct. 19, 1946
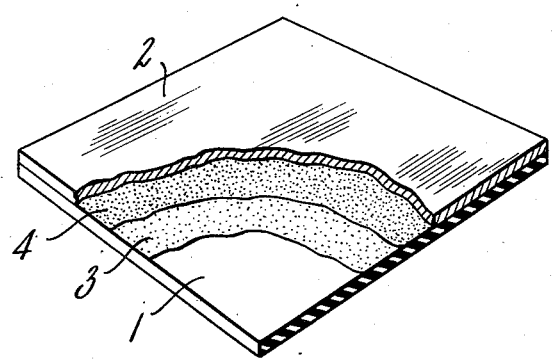
INVENTOR.
ELWOOD L. SCHOLL
BY
Charles L. Willson
ATTORNEY Patented May 1, 1951

2,551,344

UNITED STATES PATENT OFFICE 2,551,344

METHOD OF ELECTRODEPOSITING A METAL LAYER ON RUBBER

Elwood L. Scholl, Detroit, Mich., assignor to United States Rubber Company, New York, N. Y., a corporation of New Jersey Original application October 19, 1946, Serial No. 704,505. Divided and this application November 23, 1948, Serial No. 61,562

1 Claim. (Cl. 204—30)

This invention relates to a method of making a composite article, and in particular it relates to an improved method of bonding a layer of an electrodeposited metal to a rubber-like material.

This application is a division of my prior application Serial No. 704,505, filed October 19, 1946.

In bonding rubber to metal, many known processes are available. These processes usually involve vulcanization of the rubber while in contact with the metal, but in electrodepositing a layer of metal against a rubber base the rubber is not simultaneously vulcanized, and considerable difficulty is ordinarily encountered in securing a strong adhesion between the rubber and the metal.

In accordance with the practice of my invention, I have found that a high degree of adhesion can be obtained between the electrodeposited metal and a rubber-like material in the form of an organic elastic material of the general nature of rubber. This is accomplished by specially treating the surface of the rubber-like material before it receives the electrodeposited metal that is to be secured thereto.

In general the invention comprises the treatment of an elastic material with a solution of either phosphorus trichloride, chloroacetyl chloride, or bromine, allowing this coating to dry, applying a conductive layer such as graphite to the treated surface, and then electrodepositing a layer of metal against the prepared surface.

Among the objects of my invention are to provide a method of electrodepositing a layer of metal in bonded relation to the surface of a rubber-like material; to provide a method of bonding a rubber-like material and an electrodeposited metal together so that a high degree of bond may be obtained notwithstanding considerable variability in the shape of the rubber-like material against which the metal is electrodeposited; and, to provide such a method of bonding which may be accomplished expeditiously and economically.

These and other objects and advantages of my invention will appear more fully in the following detailed description when considered in connection with the accompanying drawing, in which:

The figure shown is a perspective view, partly broken away, illustrating a composite article made in accordance with the method of my invention.

With reference to the drawing I show an embodiment of my invention in the form of an elastic rubber-like material 1 to which is bonded an electrodeposited layer of metal 2. The elastic material 1 may be identified as an organic elastic material of the general nature of rubber. This definition is intended to include natural rubber as well as those synthetic rubbers such as neoprene (polymerized chloroprene), Buna S (copolymerized butadiene and styrene), and Buna N (copolymerized butadiene and acrylonitrile). It is to be understood that these elastic materials refer to a compounded stock such as used in conventional applications of these rubber or synthetic rubbers. In other words the elastic materials include such reinforcing agents as carbon black together with vulcanizing agents, accelerators, and the like. While satisfactory adhesion may be obtained between the electrodeposited metal and the elastic material, with the elastic material in an unvulcanized state, it is preferable that the elastic material be vulcanized in order to improve its physical properties. Although the rubber-like material 1 is illustrated in the drawing as a flat block or sheet, it is to be understood that the rubber-like material may be in the form of a curved surface or may have various irregular shapes.

The degree of adhesion between the electrodeposited metal 2 and the elastic material 1 may be increased substantially in accordance with the present invention by subjecting the elastic material to a specific treatment prior to the electrodeposition of the metal. This treatment consists of applying to the surface of the elastic material 1 either phosphorus trichloride, chloroacetyl chloride, or bromine to form a treated surface 3. To facilitate this treatment the chemical agent is reduced to solution form, and may be applied conveniently by spraying, painting, or dipping the article in such solution.

The phosphorus trichloride is used in concentrated form or it may be used as a solution in ether, carbon tetrachloride, or carbon disulfide. The concentration of the phosphorus trichloride in the solution should be at least 50%. The chloroacetyl chloride is used in concentrated form. Bromine is used as a ½% to 10% solution in a suitable solvent such as carbon disulfide, carbon tetrachloride, or ether.

After the rubber-like material is treated with the chemical agent, it is subjected to vulcanization in accordance with conventional vulcanization methods. Good results can also be obtained by vulcanizing the rubber-like material prior to its treatment with the chemical agent.

After the rubber-like material 1 is vulcanized and then treated and the solution dried, or after the solution is applied and the rubber-like material is then vulcanized, the treated surface 3 is coated with a layer 4 capable of rendering the surface electrically conducting. Ordinarily this is accomplished by applying over the treated surface 3, by means of a brush, a layer 4 of finely divided particles of graphite. It is to be understood that other conductive materials may be used for this purpose, such, for example, as finely divided particles of iron or bronze. After the electrically conductive layer 4 is applied, the coated article is placed in an electrolyte and a metal layer 2 is deposited thereon. The metal to be electro-deposited is preferably iron. Good adhesion results are also obtained by the electrodeposition of nickel. Conventional electrodeposition baths may be used for this purpose.

I have, therefore, provided through the present invention a novel method of adhering an electrodeposited layer of metal to an elastic material resulting in a very strong bond which requires a pull as high as 1200 pounds per square inch in shear, in order to separate the layers.

As thus described, an electrodeposited layer of metal can be firmly bonded to an elastic layer, or to some other non-metallic base member through the means of an interposing layer of elastic material, by a plurality of steps each of which is necessary in order to provide an optimum degree of adhesion between the adjacent layers.

While I have shown a preferred method of practicing my invention it is to be understood that it is susceptible of those modifications which appear obviously within the spirit of my invention and as appearing in the scope of the appended claim.

Having thus described my invention, what I claim and desire to protect by Letters Patent is:

The method of bonding an electrodeposited layer of metal to rubber so as to secure a strong bond therebetween, comprising the steps of providing a layer of rubber, treating a surface thereof with bromine, coating the treated surface with electrically conductive particles to render it electrically conductive, and electrodepositing thereon a layer of metal selected from the group consisting of iron and nickel in direct contact with the rubber so that the metal is bonded directly to the treated surface of the rubber by the electrodepositing operation and forms a bond capable of resisting a pull of hundreds of pounds per square inch in shear.

ELWOOD L. SCHOLL.

REFERENCES CITED

The following references are of record in the file of this patent:

UNITED STATES PATENTS

| Number | Name | Date |
|---|---|---|
| 889,807 | Reynolds | June 2, 1908 |
| 1,624,575 | Biddle | Apr. 12, 1927 |
| 2,078,910 | Merrill | Apr. 27, 1937 |

FOREIGN PATENTS

| Number | Country | Date |
|---|---|---|
| 710 | Great Britain | of 1910 |
| 844,367 | France | of 1939 |